Figure 1:
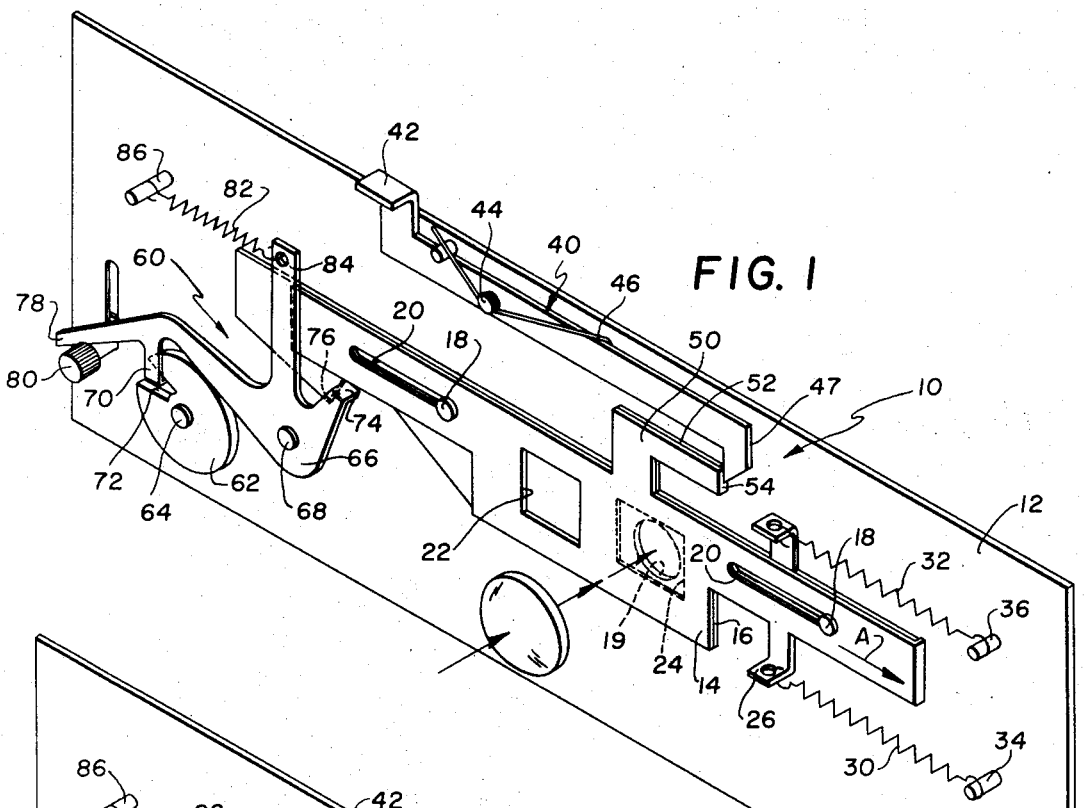
Figure 2:
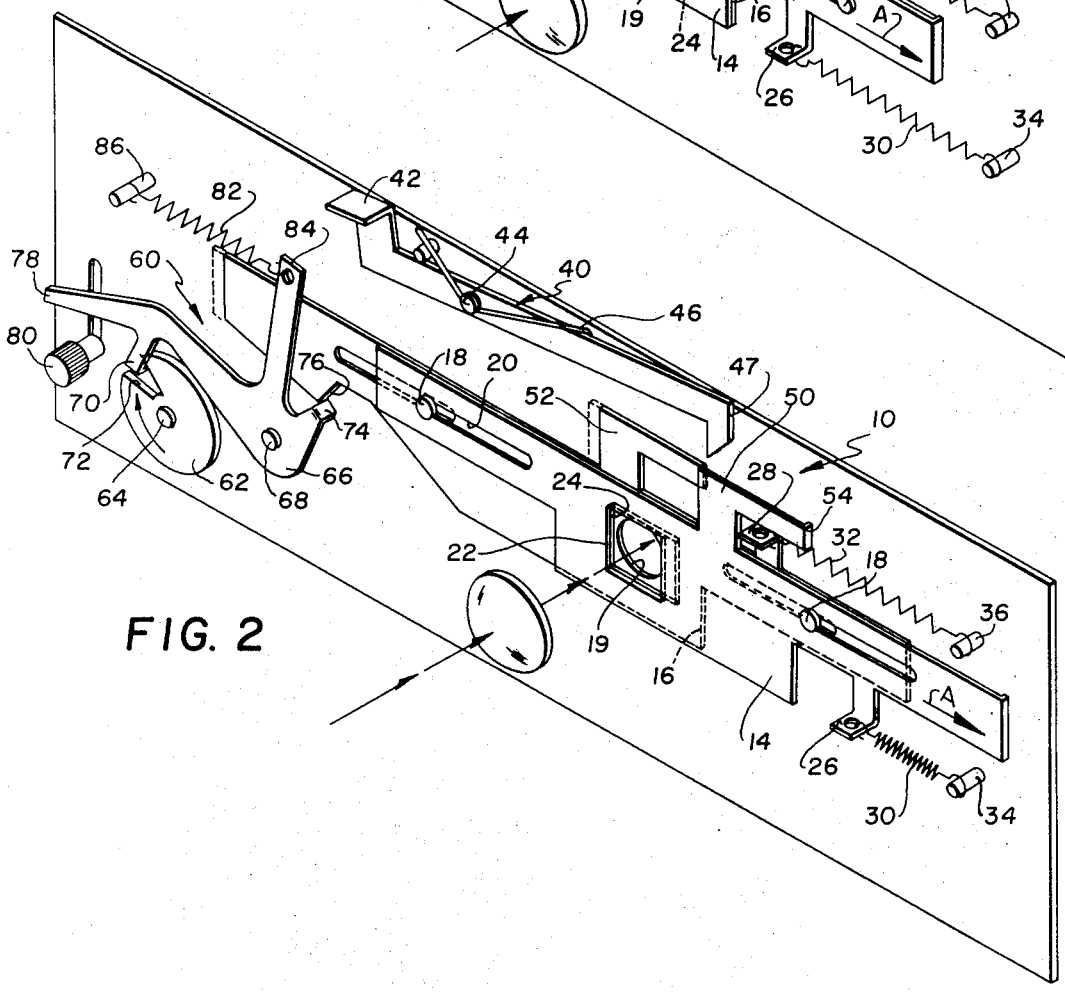

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 2, 1974

924 O.G. 9

T924,007

SHUTTER MECHANISM

Robert L. Couture, 545 Holmes Road, Rochester, N.Y. 14626, and Joseph P. Palmer, 135 Oak St., Batavia, N.Y. 14020

Filed Nov. 5, 1973, Ser. No. 412,995
**Int. Cl. G03b *9/40***
U.S. Cl. 354—246
1 Sheet Drawing. 8 Pages Specification

A shutter having a first blade movable to open an exposure aperture and a second blade movable to close the exposure aperture, but being held in an open position of the exposure aperture by the combination of the first blade and inertial delay apparatus. Upon movement of the first blade to open the exposure aperture the second blade is released to move to close the exposure aperture after a time interval which is related to a blade movement retarding effect of the inertial delay apparatus. The retarding effect of the inertial delay apparatus is provided by

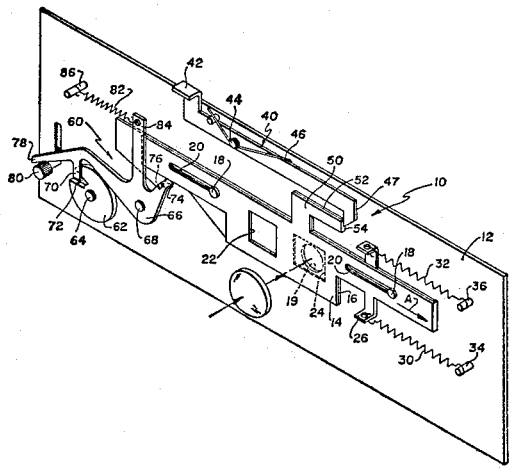

a rotatable weighted member and a pivotal control element which engages the weighted element and engages the second blade. The control element rotates the weighted element and remains in contact with the second blade until the weight element rotates through a preselected distance to permit the second blade to escape from the control element to move uninhibited. The position of the control element is adjustable relative to the weighted element to vary the time that the second blade is delayed.

July 2, 1974 R. L. COUTURE ET AL T924,007

SHUTTER MECHANISM

Filed Nov. 5, 1973